(No Model.)
A. P. GATHRIGHT & A. W. POTTS.
TIRE TIGHTENER.
No. 256,137. Patented Apr. 11, 1882.
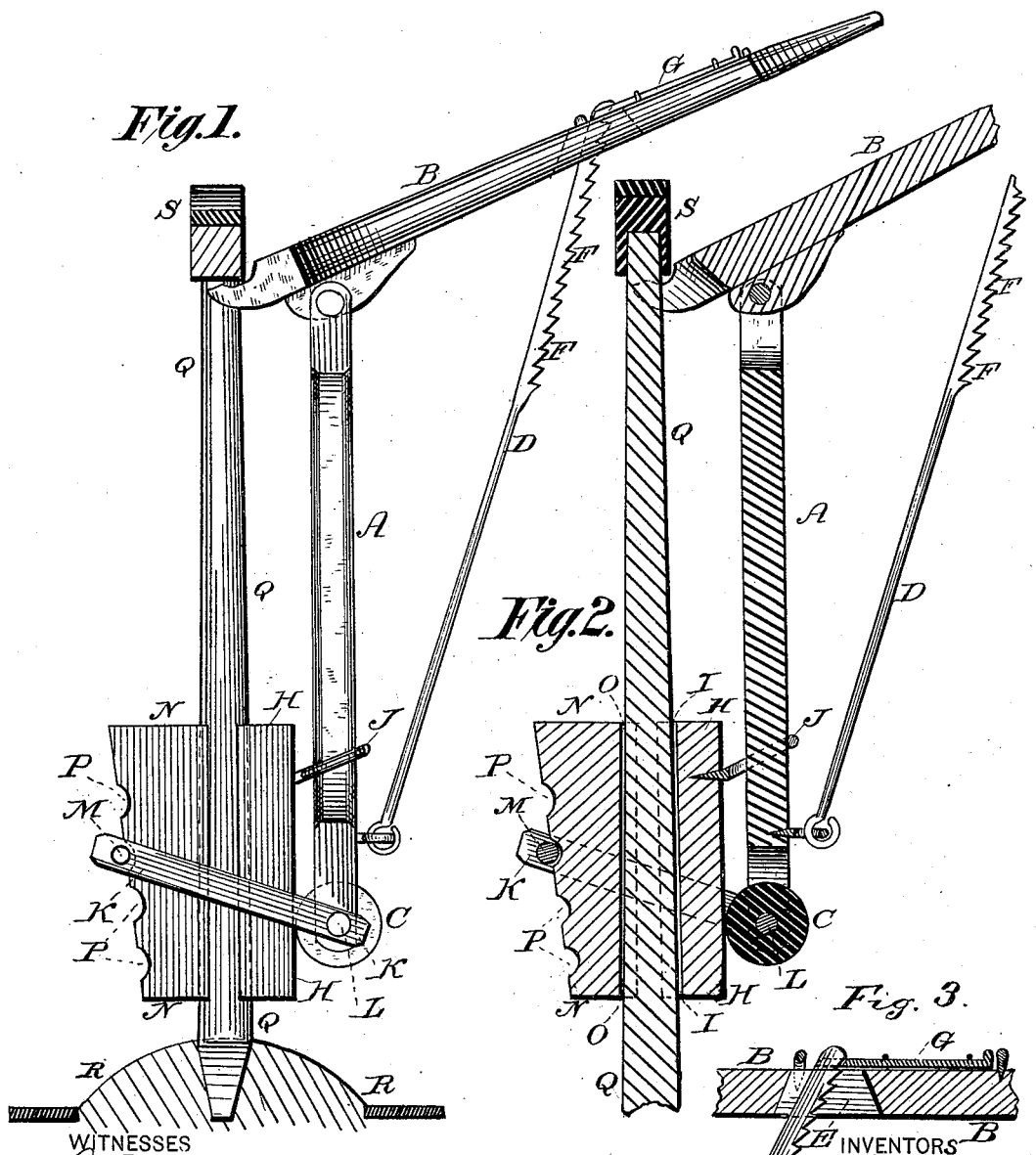

UNITED STATES PATENT OFFICE.

ALBERT P. GATHRIGHT AND ANTHONY W. POTTS, OF COOPER, GEORGIA.

TIRE-TIGHTENER.

SPECIFICATION forming part of Letters Patent No. 256,137, dated April 11, 1882.

Application filed January 23, 1882. (No model.)

*To all whom it may concern:*

Be it known that we, ALBERT P. GATHRIGHT and ANTHONY W. POTTS, of Cooper, in the county of Jackson and State of Georgia, have invented certain new and useful Improvements in Tire-Tighteners; and we do hereby declare that the following is a full, clear, and exact description of the invention, which will enable others skilled in the art to which it appertains to make and use the same, reference being had to the accompanying drawings, which form a part of this specification.

Figure 1 is a side view. Fig. 2 is a vertical sectional view of our improved tire-tightener, the end of the ratchet-bar D, and of the lever B, including the latch G, having been broken off; and Fig. 3 is a sectional view of the end of lever B, showing the latch G and the ratchet-bar engaging said latch.

Similar letters of reference indicate corresponding parts in all the figures.

This invention relates to that class of tire-tighteners which operate to expand the rim of the wheel, so as to cause the tire to fit snugly; and it consists in certain improvements in the construction of the same, which will be hereinafter fully described, and particularly pointed out in the claims.

In the drawings hereto annexed, A represents a rod or bar, forked at its upper and lower ends, as shown, to receive a lever, B, at its upper and a roller, C, at it lower end. Near the lower end of rod A is attached a rod, D, passing through a slot, E, in lever B, and provided with teeth or ratchets F, to engage a latch, G, sliding in suitable bearings upon the lever B, which may thus be retained in any position to which it may be adjusted.

H is a block provided on its front side with a vertical groove, I, and on its rear side with a staple or bracket, J, by which it is attached, as shown, to the rod A in such a manner as to be able to slide longitudinally upon the latter. Said rod A is provided at its lower forked end with a pair of pivoted arms, K, which may be pivoted upon extensions of the shaft L, which forms a bearing for the roller C. The front ends of arms K are connected by a pin, M.

N is a wedge-shaped block, the rear side of which has a vertical groove, O, corresponding to the groove I in block H. The front side of wedge N has several transverse grooves, P, adapted to receive the pin M, as will be presently described.

Q in the drawings illustrates one of the spokes, R the hub, and S the rim, of an ordinary vehicle-wheel, the hub and rim being shown in cross-section.

In operation one of the spokes is adjusted in the grooves I O of the block H and wedge N, which latter is held by the pin M of arms K in such a manner as to clamp the spoke tightly. The front forked end of lever B is now adjusted under the wheel rim or felly and the rear end of said lever lowered, thus causing roller C to travel downward on the rear side of block H, which is thereby caused to clamp the spoke very tightly while the felly is raised up off it. A suitable washer may now be placed upon the end of the spoke and the felly let back to its place, the washer serving to expand the rim.

The operation may be repeated upon any or all of the spokes.

Our improved tire-tightener is simple, convenient, and easily adjusted and operated, and it cannot in any way injure the spokes or other parts of the wheel.

Having thus described our invention, we claim, and desire to secure by Letters Patent of the United States—

1. In a tire-tightener, the combination of the forked rod A, having roller C and pivoted arms K, connected by a pin, M, the block H, having groove I, and the wedge N, having vertical groove O and transverse grooves P, substantially as and for the purpose set forth.

2. The combination of the forked rod A, having lever B and roller C, the grooved block H, and wedge N, and arms K for connecting said block and wedge to the rod A, substantially as set forth.

3. As an improvement in tire-tighteners, the combination of the forked rod A, having roller C, pivoted arms K, connected by pin M, and ratchet-bar D, the forked lever B, having slot E and latch G, the vertically-grooved block H, having staple J, by which it is attached to rod A, and the wedge N, having vertical groove O and transverse grooves P, all arranged and operating, substantially as and for the purpose set forth.

In testimony that we claim the foregoing as our own we have hereto affixed our signatures in presence of two witnesses.

ALBERT P. GATHRIGHT.
        ANTHONY W. POTTS.

Witnesses:
  S. M. HERRINGTON,
  JOHN I. HUGGINS.